US005238037A

United States Patent [19]

Gunzner et al.

[11] Patent Number: 5,238,037

[45] Date of Patent: Aug. 24, 1993

[54] ADJUSTABLE WOBBLE DADO ASSEMBLY FOR CUTTING GROOVES WITH GREATER ACCURACY

[75] Inventors: Fred G. Gunzner, Bend; John A. Lanning, Crooked River Ranch, both of Oreg.

[73] Assignee: Dalex, Inc., Redmond, Oreg.

[21] Appl. No.: 961,115

[22] Filed: Oct. 14, 1992

[51] Int. Cl.[5] .......... B23C 1/02; B27B 33/00

[52] U.S. Cl. .......... 144/238; 144/218; 407/48

[58] Field of Search .......... 83/698; 144/218, 238, 144/222; 407/47, 48

[56] References Cited

U.S. PATENT DOCUMENTS 682,810 9/1901 Parks .

716,094 12/1902 Peoples .

2,286,633 6/1942 McCabe .

2,458,216 1/1949 Spindt .

2,544,814 3/1951 Warren .

2,665,722 1/1954 Edgemond, Jr. .

2,922,449 1/1960 Sam .

2,925,108 2/1960 Freeman .......... 144/238

3,172,437 3/1965 Hansen .

3,780,780 12/1973 Pettigrew et al. .......... 144/218

3,848,512 11/1974 Erhardt .

4,018,256 4/1977 Niehuas et al. .......... 144/238

4,055,204 10/1977 Gunzner et al. .

*Primary Examiner*—W. Donald Bray

*Attorney, Agent, or Firm*—Chernoff, Vilhauer, McClung & Stenzel

[57] ABSTRACT

An adjustable wobble dado assembly has a planar circular blade with spaced peripheral cutting teeth. The cutting teeth have respective top cutting edges at their radially outer extremities which are located at progressively different radial distances from the axis of the blade so that, when the axis is tilted relative to the arbor for purposes of cutting a groove, those top cutting edges located at progressively greater radial distances from the axis cut portions of the groove located progressively further from the longitudinal center of the groove. The top cutting edges also have respective different top angles relative to the axis of the blade, those edges located at progressively greater radial distances from the axis having progressively greater top angles relative to the axis. An adjustable hub assembly includes a hub composed of an integral portion of the material of the blade having a thickness greater than that of the blade. The hub protrudes axially in opposite directions from the blade and terminates in parallel planar outer surfaces facing opposite to each other and inclined with respect to the axis of the blade.

3 Claims, 4 Drawing Sheets

ADJUSTABLE WOBBLE DADO ASSEMBLY FOR CUTTING GROOVES WITH GREATER ACCURACY

BACKGROUND OF THE INVENTION

The present invention relates to adjustable wobble dado assemblies for cutting elongate grooves of varying widths. More particularly, the invention relates to an improvement to existing wobble dado assemblies which enables such assemblies to cut grooves of varying widths having cross sections more accurately rectangular in shape than can be obtained with the use of existing conventional adjustable wobble dado assemblies.

Adjustable wobble dado assemblies in various forms have long been used in the wood-working trades, as exemplified by those shown in the following U.S. patents:

U.S. Pat. No. 682,810
U.S. Pat. No. 716,094
U.S. Pat. No. 2,286,633
U.S. Pat. No. 2,458,216
U.S. Pat. No. 2,544,814
U.S. Pat. No. 2,665,722
U.S. Pat. No. 2,922,449
U.S. Pat. No. 3,172,437
U.S. Pat. No. 3,848,512
U.S. Pat. No. 4,055,204.

All of such wobble dado assemblies have adjustable hub assemblies for fixedly mounting a blade upon an arbor and adjustably tilting the axis of the blade at various angles with respect to the arbor to cut elongate grooves of varying widths. When adjusted for cutting the narrowest possible groove, the blade axis of such a dado assembly is normally not tilted with respect to the arbor but rather is oriented so as to be coaxial with the arbor. At such a blade orientation, a narrow groove substantially rectangular in cross section can be cut. However, as the axis of the blade is tilted to assume progressively greater angles relative to the arbor for cutting progressively wider grooves, the cross sections of the grooves become increasingly nonrectangular. In such case the bottoms of the elongate grooves assume a concave, arcuate cross-sectional shape, as depicted in FIG. 7 as well as some of the more accurately-drawn prior art patents such as U.S. Pat. Nos. 2,665,722 and 3,172,437. As the grooves become wider, the nonrectangularity of their cross sections becomes so prominent that the use of such wobble dado assemblies becomes unsatisfactory for precise wood-working.

Another source of inaccuracy in prior art adjustable wobble dado assemblies is the multiplicity of separate parts in their adjustable hub assemblies. As shown in the aforementioned patents, it is normal for such adjustable hub assemblies to include both inner and outer tapered adjustment rings or discs on each side of the blade, all separate from the blade and interposed between the blade and the surfaces of the arbor to which the blade is fixed. Such multi-piece structures create at least four interface surfaces between separate parts within the hub assembly where tolerance errors can accumulate, affecting the tilt of the blade. These accumulated tolerance errors are magnified at the locations of the cutting teeth in proportion to the magnitude of the blade's radius, thereby causing inaccuracies and inconsistencies in the width dimension of the groove formed by the teeth. One prior art structure, i.e. that shown in U.S. Pat. No. 2,922,449, has a lesser number of separate components in its hub assembly due to the fact that the blade is stamped with a deformed thin central section lying at an angle to the plane of the blade, thereby eliminating the need for the separate inner rings or discs employed in other prior art structures. However, a central section of this type introduces another source of inaccuracy because of the natural tendency of such a thin section, created by high pressure deformation, to warp.

Accordingly, what is needed is an adjustable wobble dado assembly which is capable of cutting elongate grooves with greater accuracy, both with respect to their desired rectangular cross-sectional shapes and with respect to their dimensions.

SUMMARY OF THE PRESENT INVENTION

The present invention is primarily directed to an adjustable wobble dado assembly which overcomes the foregoing drawbacks of the prior art by providing an improved arrangement of cutting teeth which eliminates, or at least reduces significantly, the previous deviations from the desired rectangular cross-sectional shapes of grooves cut to varying widths. The invention accomplishes this objective by providing cutting teeth having respective top cutting edges which are located at progressively different radial distances from the axis of the blade so that, when the axis is tilted relative to the arbor, those top cutting edges located at progressively greater radial distances from the axis cut portions of the groove located progressively further from the longitudinal center of the groove. Preferably, but not necessarily, the top cutting edges also have respective different top angles relative to the axis of the blade, those edges located at progressively greater radial distances from the axis having progressively greater top angles relative to the axis.

The foregoing varying cutting teeth configurations preferably are obtained by a novel toothgrinding technique which grinds the teeth of the blade in succession while the axis of the blade is tilted with respect to an arbor upon which it is mounted. The resultant varying teeth configurations are capable of cutting a substantially true rectangular groove at a predetermined adjustable width significantly greater than that corresponding to the narrowest available setting of the blade. Grooves cut at widths greater than such predetermined width have only slightly concave bottoms, and grooves cut at narrower widths have only slightly convex bottoms, neither being so prominent as to result in a significant deviation from a true rectangular cross section.

As a secondary aspect of the invention, preferably usable in combination with the above-described varying teeth configurations but also capable of being used separately, an improved adjustable hub assembly is provided to reduce significantly the accumulated tolerance error prevalent in prior dado assemblies, without introducing other sources of error. This latter objective is accomplished by providing, as part of the adjustable hub assembly, a hub composed of an integral portion of the material of the blade having a thickness greater than that of the blade and protruding axially in opposite directions from the blade, the hub terminating in parallel planar outer surfaces facing opposite to each other and inclined with respect to the axis of the blade. This integral hub replaces the inner tapered rings or discs used in prior structures and thereby eliminates two of the error-causing interfaces of previous conventional adjustable hub assemblies. The fact that the integral hub is thicker than the blade, and is formed by a process such as machining and/or casting as opposed to stamping or forging, prevents error-causing warping of the hub.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
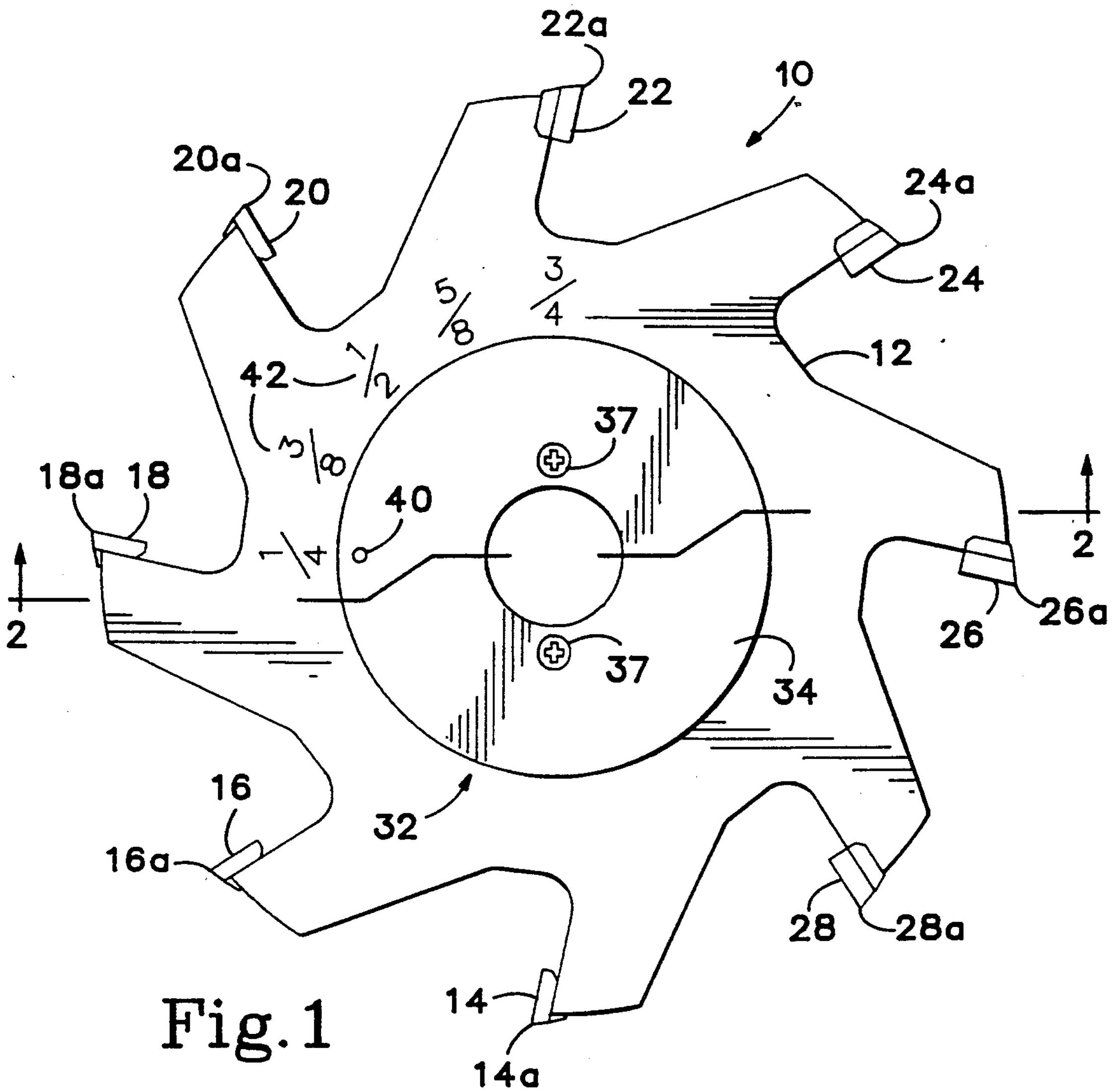
FIG. 1 is a side view of an exemplary embodiment of an adjustable wobble dado assembly constructed in accordance with the present invention.
Figure 2:
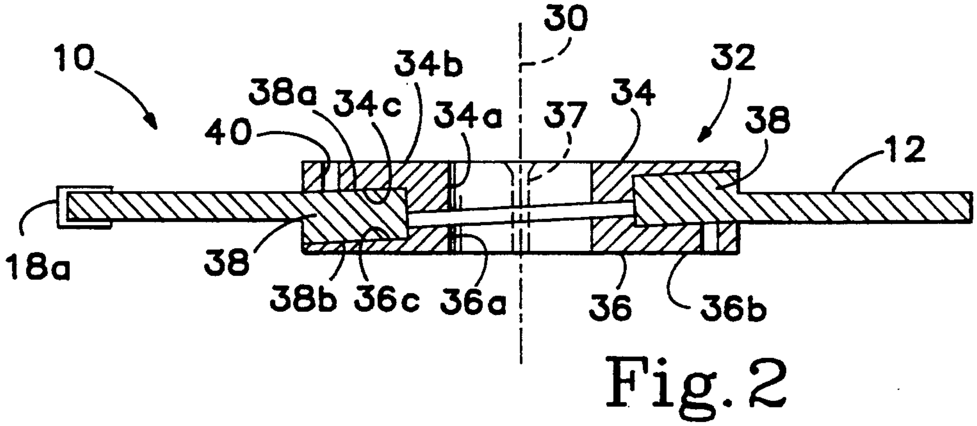
FIG. 2 is a sectional view taken along line 2—2 of FIG. 1.

An exemplary embodiment of the adjustable wobble dado assembly, indicated generally as 10, comprises a planar circular steel blade 12 having respective spaced peripheral cutting teeth 14, 16, 18, 20, 22, 24, 26 and 28 of a material, such as carbide or high-speed steel, significantly harder and more wear-resistant than the blade. The blade has a central axis 30 extending perpendicular to the plane of the blade.

A hub assembly, indicated generally as 32, fixedly mounts the blade 12 upon an arbor and is adjustable to tilt the axis 30 of the blade at various angles with respect to the arbor. The hub assembly 32 includes a pair of tapered, disc-shaped adjusting members 34, 36 mounted on opposite sides of the blade 12 interconnected by a pair of screws 37, and having circular apertures **34*a*, 36*a* formed centrally therein defining an arbor bore. The adjustment members have respective planar outer surfaces 34*b*, 36*b* perpendicular to the axis of the arbor bore, and respective parallel planar inner surfaces 34*c*, 36*c* facing each other and inclined with respect to the axis of the arbor bore. The hub assembly 32 also includes a circular hub 38 composed of an integral portion of the material of the blade 12 and having a thickness, formed by casting and/or machining of the blade material, greater than that of the blade 12 and protruding axially in opposite directions therefrom. The hub 38 terminates in respective axially-protruding parallel planar outer surfaces 38*a* and 38*b* facing opposite to each other and inclined with respect to the axis 30 of the blade. With the screws 37 loosened, the outer surfaces 38*a*, 38*b* of the hub 38 movably contact the inner surfaces 34*c*, 36*c* of the adjusting members 34 and 36 so as to enable the adjusting members to rotate with respect to the blade 12. Such rotation adjustably tilts the axis 30 of the blade relative to the axis of the arbor bore 34*a*, 36*a*, and thus relative to any arbor upon which the dado assembly 10 is mounted. The degree of rotation determines the degree of tilt which in turn determines the width of the groove to be cut by the blade 12, as indicated by the markings 42 on the blade in relation to an indicator hole 40 in the adjusting member 34. After the adjusting members have been rotated to their desired setting, the screws 37** are tightened to fix the adjusting members in their desired rotational orientation.

The above-described adjustable hub assembly 32 thus has only two major components, the adjusting members 34 and 36, which are not integral with the blade 12. Accordingly, only two interfaces of separate parts exist where tolerance error can occur, as opposed to the normal four such interfaces in previous adjustable hub assemblies. The respective surfaces **34*c*, 36*c*, 38*a* and 38*b* are precisely machined to further minimize such tolerance errors, and the surfaces 38*a* and 38*b* are prevented from warping by the thick nature of the hub 38**.

In addition, the hub assembly has the advantage of providing an extremely thin structure, allowing it to be used with direct motor-driven machines having short arbor shafts. To further maximize the variety of machines with which the dado assembly can be used, bushings to reduce the arbor bore to various smaller sizes are also provided (not shown).

Half of the cutting teeth of the blade 12 (teeth 14, 16, 18 and 20) are formed for cutting the portions of a groove on one side of its longitudinal centerline, while the other half of the cutting teeth (teeth 22, 24, 26 and 28) are formed for cutting the portions of the groove on the opposite side of the longitudinal centerline. The left-hand or right-hand nature of a particular cutting tooth is recognizable primarily by the angle of the front face of the tooth.

Previously the top cutting edges of dado teeth, at their outer radial extremities, have been located radially equidistant from the axis of the blade and oriented either parallel to the axis or with identical top angles relative to the axis (the direction of each angle, however, depending upon the right-hand or left-hand nature of the particular tooth). In contrast, in the present invention, each cutting tooth has its own unique configuration different from those of the other cutting teeth. Essentially, the top cutting edges **14*a*, 16*a*, 18*a*, 20*a*, 22*a*, 24*a*, 26*a* and 28*a* are located at progressively different radial distances from the axis 30 of the blade so that, when the axis is tilted relative to the arbor for purposes of cutting an elongate groove, those top cutting edges located at progressively greater radial distances from the axis 30 cut portions of the elongate groove located progressively further from the longitudinal center of the groove. Also, preferably, the top cutting edges of the respective teeth have respective different top angles relative to the axis 30** of the blade, those top cutting edges located at progressively greater radial distances from the axis of the blade having progressively greater top angles relative to the axis.

Figure 3:
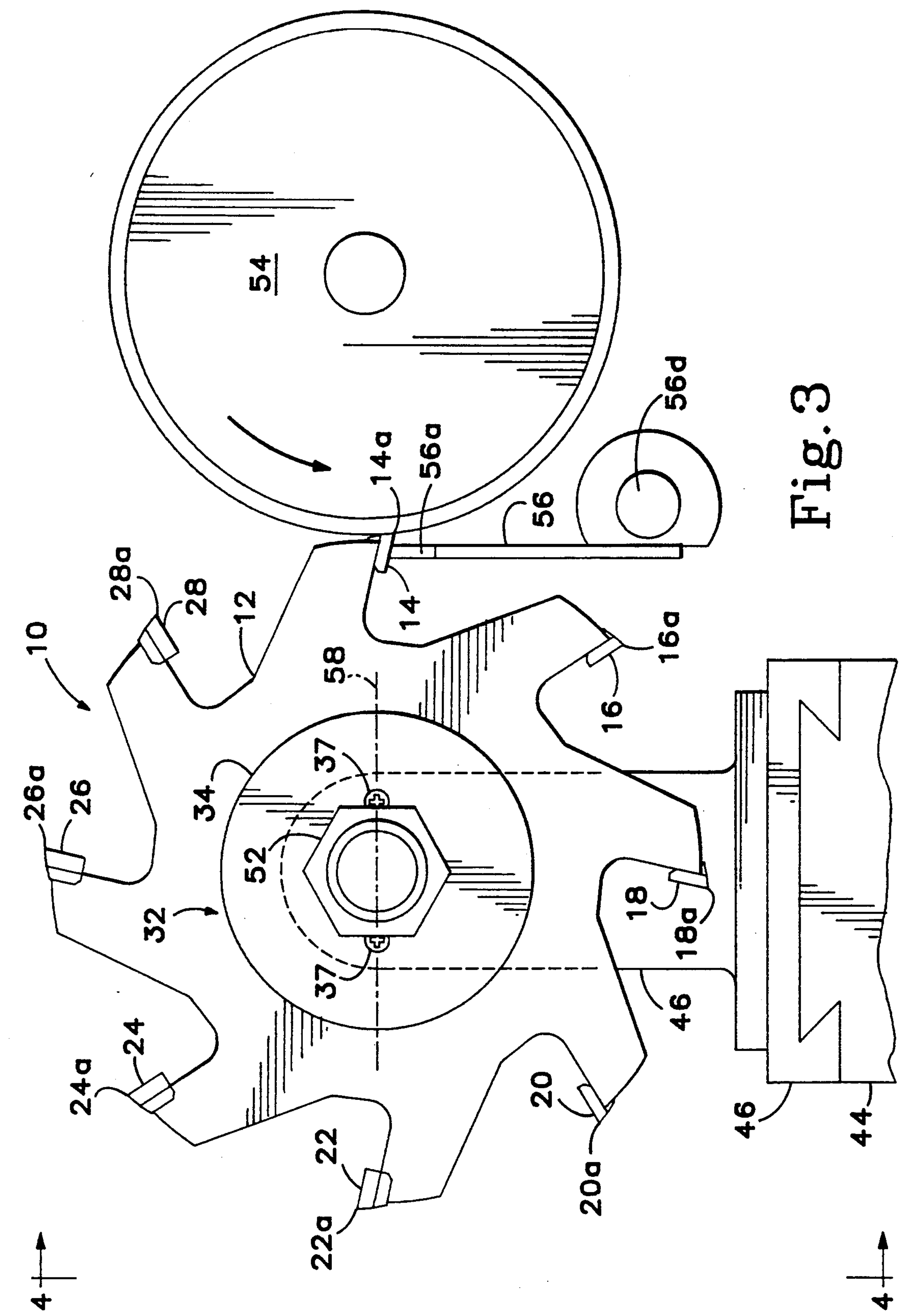
FIG. 3 is a side view of an exemplary grinding fixture showing how the teeth of the dado assembly of FIG. 1 can be ground to achieve the desired varying teeth configurations.
Figure 4:
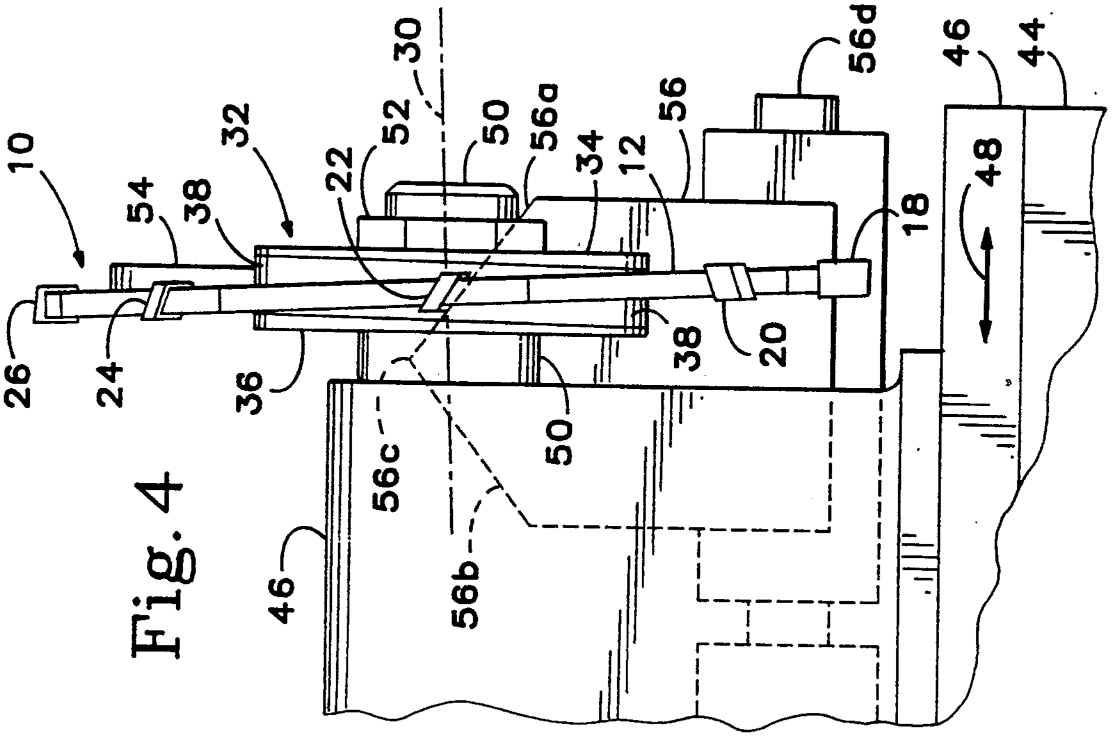
FIG. 4 is an end view of the grinding fixture taken along line 4—4 of FIG. 3.
Figure 5:
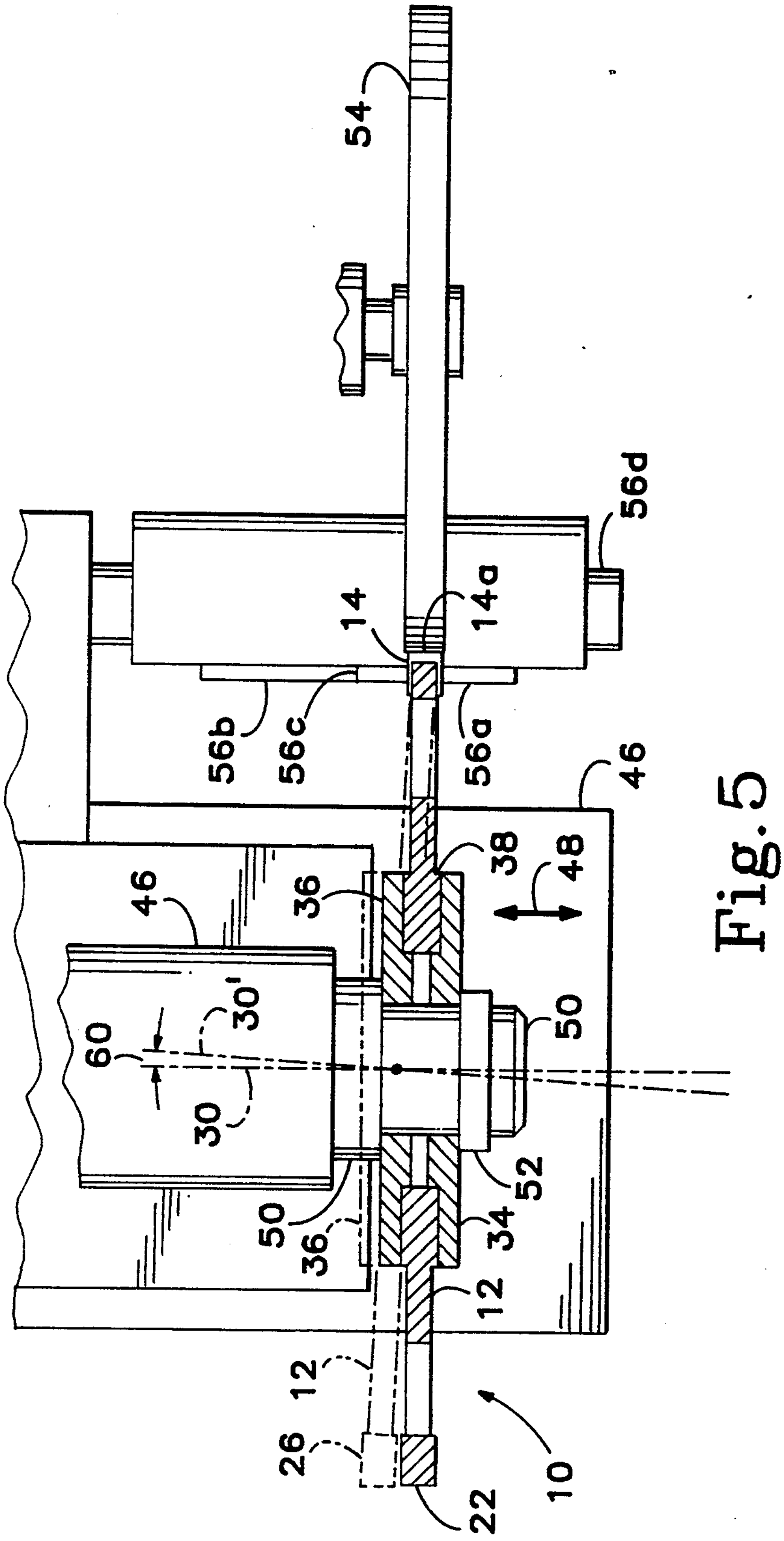
FIG. 5 is a top view of the grinding fixture, with the blade shown in cross section for clarity.

The manner in which the different configurations of the respective teeth are formed is illustrated in FIGS. 3–5 with respect to a simple, manually-operated tooth-grinding fixture (a more automated fixture could be employed if desired). The fixture comprises a base 44 upon which is slidably mounted an arbor support 46 capable of being moved freely in opposite longitudinal directions relative to the base 44 as indicated by the arrow 48 (FIGS. 4 and 5). An arbor 50 is rotatably journaled in the support 46 so as to rotate freely in either a clockwise or counterclockwise direction. Securely mounted upon the arbor 50 by means of an arbor nut 52 is the dado assembly 10, with the arbor 50 extending through the arbor bore 34*a*, 36*a* of the adjustable hub assembly 32. As can be seen in FIG. 4, for purposes of grinding the cutting teeth the adjustable hub assembly 32 is set so that the axis 30 of the blade 12 is tilted with respect to the arbor 50. The particular magnitude of the tilt selected for purposes of grinding the cutting teeth can be a matter of choice for the user. For example, if the user expects to use the dado assembly primarily for repetitive cutting of grooves of a particular width, the adjustable hub assembly 32 should be set to that width preparatory to grinding the teeth. Alternatively, if the dado assembly is expected to be used for cutting a wide variety of widths, an intermediate groove width setting should be selected approximately in the middle of the range between the narrowest and widest grooves expected to be cut.

The differences in configurations of the respective cutting teeth are obtained by grinding the top of each tooth sequentially by moving it past a stationary diamond grinding wheel 54 while the blade axis 30 is tilted relative to the arbor 50 in accordance with a selected width setting as described above. The arbor support 46 is moved longitudinally while the face of the tooth slides along the sloped top 56*a* or 56*b* of a guide 56, the slopes of the guide tops 56*a* and 56*b* having been selected to match approximately the front face angles of the left-hand and right-hand teeth. For example, to grind a tooth such as 14 as shown in FIGS. 3-5, the blade 12 is rotatably positioned so that the tooth 14 rests atop the guide surface 56*a* near the lower end of the surface, and the arbor support 46 is then moved longitudinally to the left in FIG. 4, sliding the tooth 14 up the sloped surface 56*a* and past the grinding wheel 54. The grinding wheel thus determines the radial distance of the top cutting edge 14*a* from the blade axis 30, as well as the top angle of the top cutting edge relative to the blade axis.

In the example illustrated in FIGS. 3-5, the adjustable hub assembly 32 has been set at a selected groove width which tilts the plane of the blade 12 about a tilt axis 58 extending diametrically between teeth 14 and 22. Thus, as illustrated in the top view of FIG. 5 showing a section of the blade 12 taken along the tilt axis 58, the radial distance between the axis of the blade 30 and the point of contact of the grinding wheel 54 with the top cutting edge 14*a* of the tooth 14 is measured along a line perpendicular to the blade axis 30. However, if the blade 12 is then rotated 90° counterclockwise from the orientation shown in FIGS. 3-5, so that the cutting tooth 18 is positioned against the guide surface 56*a* and moved into contact with the grinding wheel 54, the contact between the top of the tooth 18 and the grinding wheel 54 will occur with the diametric section of the blade 12, extending between the teeth 18 and 26, oriented as shown in dotted lines in FIG. 5 when viewed from the top. In such orientation, the blade hub assembly is shifted longitudinally from where it was when the top of the tooth 14 was ground, and the blade axis 30 is oriented as indicated by the phantom line 30' rather than the phantom line 30. In this orientation the radial distance between the blade axis and the point of contact of the grinding wheel 54 with the top cutting edge 18*a* of the tooth 18 is greater than was the radial distance between the blade axis and the comparable point of contact of the grinding wheel with the top cutting edge 14*a* of the tooth 14. Accordingly, the top cutting edge 18*a* of tooth 18 is formed by the grinding wheel 54 at a greater radial distance from the blade axis than was the top cutting edge 14*a* of tooth 14. Moreover, whereas the top cutting edge 14*a* of tooth 14 was ground parallel to the blade axis, the top cutting edge 18*a* of tooth 18 is ground at an angle to the blade axis equal to the angle 60 between the phantom blade axis lines 30 and 30', respectively, as seen in FIG. 5.

The radial distances between the blade axis 30 and the top cutting edges of teeth 16 and 20 when they are similarly ground, as well as the top angles of these cutting edges relative to the blade axis, will be at intermediate magnitudes between those of teeth 14 and 18.

The top cutting edges of teeth 22, 24, 26 and 28 are formed by resting each tooth in succession on the opposite sloped surface 56*b* of the guide 56, with the apex 56*c* of the guide 56 being slidably shifted on the guide support rod 56*d* to the opposite side of the grinding wheel 54 from the position shown in FIG. 4. The teeth are moved across the surface 56*b* through the grinding wheel by sliding the arbor support 46 to the right in FIG. 4. Thus, the respective radial distances between the blade axis 30 and the top cutting edges 22*a*, 24*a*, 26*a* and 28*a* will correspond to those of the diametrically opposed top cutting edges 14*a*, 16*a*, 18*a* and 20*a*, respectively, as will the respective top angles of the cutting edges relative to the blade axis (although the top angles will be in the opposite direction for teeth 22, 24, 26 and 28).

Figure 6:
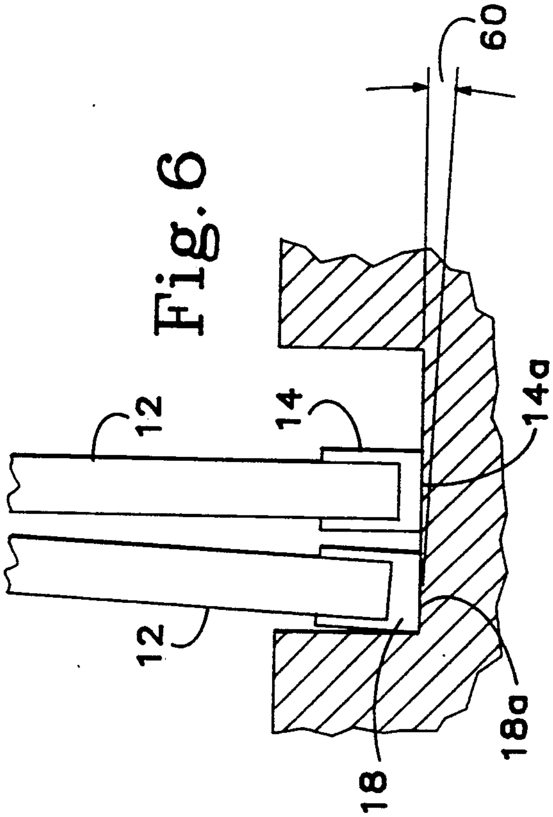
FIG. 6 is an enlarged schematic view illustrating the differences in configuration between two different exemplary teeth of the dado assembly, and also illustrating the manner in which these different teeth configurations cooperate to produce a groove of substantial width having, a true rectangular cross section.
Figure 7:
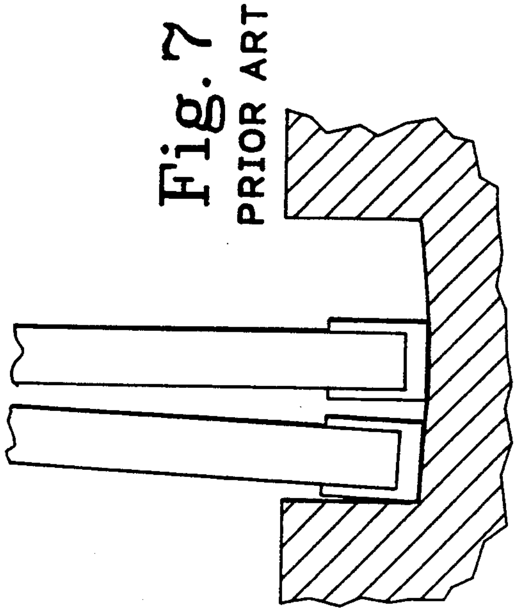
Fig. 7 PRIOR ART
FIG. 7 is an enlarged schematic view comparable to FIG. 6 but showing previous cutting teeth configurations and the resultant cross section of a groove of substantial width.

The result of such differences in radial distances and top angles of the top cutting edges relative to the blade axis can be seen by a comparison of FIGS. 6 and 7. FIG. 6 illustrates schematically the action of the top cutting edges 14*a* and 18*a* respectively as a groove is being cut with the dado assembly 10 at the same width setting as when the cutting teeth were ground. The cutting edge 14*a*, the edge radially closest to the blade axis 30, cuts a longitudinally central portion of the groove, while the cutting edge 18*a*, the edge radially furthest from the blade axis, cuts a portion of the groove furthest from the longitudinal center (in reality, the paths of the teeth may partially overlap depending upon the width setting, but they are shown schematically in non-overlapping relation for sake of clarity). The teeth 16 and 20 cut portions of the groove between the portions cut by teeth 14 and 18. The other four teeth 22, 24, 26 and 28 perform similarly to teeth 14, 16, 18 and 20, respectively, in cutting the opposite side of the groove.

As can be seen in FIG. 6, the fact that the cutting edge 18*a* (as well as cutting edges 16*a* and 20*a*) are radially further from the blade axis than the cutting edge 14*a*, enables the groove to be cut with a substantially flat bottom and resultant desirable rectangular cross section. In contrast, as shown in FIG. 7, the comparable teeth of previous adjustable wobble dado assemblies, having top cutting edges radially equidistant from the blade axis, will cut the same groove with a curved, concave bottom because the teeth lack the variable radial extension from the blade axis needed to compensate for the tilt of the blade.

Moreover, the greater top angle 60 of the cutting edge 18*a* relative to the blade axis, as compared to the cutting edge 14*a*, enhances the flatness of the groove bottom and the squareness of the groove corners.

Readjusting the adjustable hub assembly 32 to cut a wider groove than that shown in FIG. 6 will result in a slightly curved concave groove bottom, but not nearly to the degree shown in FIG. 7. Conversely, readjustment of the hub assembly to narrow the width of the groove will result in a slightly convex curved groove bottom, likewise of insufficient prominence to be considered detrimental.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An adjustable wobble dado assembly for cutting elongate grooves of varying width, said assembly comprising:

(a) a planar circular blade having respective spaced, peripheral cutting teeth and a central axis extending perpendicular to the plane of said blade;

(b) an adjustable hub assembly adjacent said axis of said blade for fixedly mounting said blade upon an arbor and adjustably tilting said axis at various angles with respect to said arbor;

(c) said respective cutting teeth having respective top cutting edges at their radially outer extremities, said respective top cutting edges being located at progressively different radial distances from said axis of said blade so that, when said axis is tilted relative to said arbor for purposes of cutting an elongate groove, those top cutting edges located at progressively greater radial distances from said axis cut portions of the elongate groove located progressively further from the longitudinal center of said groove.

2. The assembly of claim 1 wherein said top cutting edges have respective different top angles relative to said axis of said blade, those top cutting edges located at progressively greater radial distances from said axis having progressively greater top angles relative to said axis.

3. An adjustable wobble dado assembly for cutting elongate grooves of varying width, said assembly comprising:

(a) a planar circular blade, of a first thickness, having respective spaced, peripheral cutting teeth and a central axis extending perpendicular to the plane of said blade; and (b) an adjustable hub assembly adjacent said axis of said blade for fixedly mounting said blade upon an arbor and adjustably tilting said axis at various angles with respect to said arbor, said adjustable hub assembly comprising respective interconnected adjusting members on opposite sides of said blade rotatably movable with respect to said blade, said adjusting members having means defining an arbor bore formed centrally therethrough and having respective parallel planar inner surfaces facing each other and inclined with respect to said bore, and a hub composed of an integral portion of the material of said blade and having a second thickness greater than said first thickness protruding axially in opposite directions from said blade and terminating in respective axially-protruding parallel planar outer surfaces facing opposite to each other and inclined with respect to said axis of said blade for movably contacting said inner surfaces of said adjusting members.

* * * * *